United States Patent
Minsch et al.

(10) Patent No.: US 12,409,616 B2
(45) Date of Patent: Sep. 9, 2025

(54) WINDING HEAD FOR AT LEAST TWO FIBER STRANDS, AND WINDING METHOD FOR PRODUCING FIBER-REINFORCED COMPONENTS

(71) Applicant: Mercedes-Benz Group AG, Stuttgart (DE)

(72) Inventors: Niklas Minsch, Unterensingen (DE); Tim Zanker, Nufringen (DE); Peter Graupner, Untergruppenbach (DE)

(73) Assignee: Mercedes-Benz Group AG, Stuttgart (DE)

( * ) Notice: Subject to any disclaimer, the term of this patent is extended or adjusted under 35 U.S.C. 154(b) by 93 days.

(21) Appl. No.: 18/549,496

(22) PCT Filed: Dec. 8, 2021

(86) PCT No.: PCT/EP2021/084755
§ 371 (c)(1),
(2) Date: Sep. 7, 2023

(87) PCT Pub. No.: WO2022/189019
PCT Pub. Date: Sep. 15, 2022

(65) Prior Publication Data
US 2024/0149539 A1    May 9, 2024

(30) Foreign Application Priority Data
Mar. 12, 2021    (DE) .................... 10 2021 001 342.5

(51) Int. Cl.
B29C 70/38    (2006.01)
B29C 53/56    (2006.01)
(Continued)

(52) U.S. Cl.
CPC ............ *B29C 70/384* (2013.01); *B29C 53/56* (2013.01); *B29C 53/8066* (2013.01); *B29C 70/32* (2013.01)

(58) Field of Classification Search
CPC .................................................... B29C 70/384
See application file for complete search history.

(56) References Cited

U.S. PATENT DOCUMENTS 2,674,557 A * 4/1954 Boggs .................... B29C 53/60
                                                       156/184
3,708,132 A    1/1973 Lang
(Continued)

FOREIGN PATENT DOCUMENTS

DE          31 27 084 A1    10/1982
DE    10 2010 047 361 A1     4/2012
(Continued)

OTHER PUBLICATIONS

PCT/EP2021/084755, International Search Report dated Apr. 8, 2022 (Two (2) pages).
(Continued)

*Primary Examiner* — Jeffry H Aftergut
(74) *Attorney, Agent, or Firm* — Crowell & Moring LLP

(57) ABSTRACT

A winding head includes a first supply spool for receiving a first fiber strand and a second supply spool for receiving a second fiber strand, an impregnation unit through which the first fiber strand and the second fiber strand can be guided for impregnation with liquid resin, a first deflection roller assigned to the first supply spool, and a second deflection roller assigned to the second supply spool. The winding head further includes a bundling roller, at which the first fiber strand and the second fiber strand can be combined to form a complete fiber strand upstream of the impregnation unit, and which is arranged downstream of and spaced apart from the first deflection roller and the second deflection roller. A (Continued)

spreading roller is arranged downstream of and spaced apart from the bundling roller to form two fiber spreading sections.

9 Claims, 2 Drawing Sheets

(51) Int. Cl.
    *B29C 53/80*     (2006.01)
    *B29C 70/32*     (2006.01)

(56) References Cited

U.S. PATENT DOCUMENTS

| | | | |
|---|---|---|---|
| 4,145,740 A | | 3/1979 | McClean et al. |
| 4,610,402 A | | 9/1986 | Corbett et al. |
| 8,490,253 B2 | * | 7/2013 | Junker .................. D02J 1/18 19/66 R |
| 2003/0186038 A1 | | 10/2003 | Ashton et al. |

FOREIGN PATENT DOCUMENTS

| | | |
|---|---|---|
| DE | 10 2017 005 754 A1 | 1/2018 |
| EP | 0 491 354 A1 | 6/1992 |
| EP | 2 476 539 A1 | 7/2012 |
| JP | 2016-187951 A * | 11/2016 |

OTHER PUBLICATIONS

German-language German Office Action issued in German application No. 10 2021 001 342.5 dated May 23, 2023 (Six (6) pages).

* cited by examiner

WINDING HEAD FOR AT LEAST TWO FIBER STRANDS, AND WINDING METHOD FOR PRODUCING FIBER-REINFORCED COMPONENTS

BACKGROUND AND SUMMARY OF THE INVENTION

The invention relates to a winding head for producing fiber-reinforced components by winding a resin-impregnated fiber strand around a winding support, wherein the winding head comprises a supply spool for the fiber strand and an impregnation unit through which the fiber strand can be guided for impregnation with liquid resin. The invention also relates to a winding method for producing fiber-reinforced components by using such a winding head.

DE 10 2017 005 754 A1 discloses a winding system in which a robot arm with a winding head is surrounded by an octagonal holder for holding eight winding supports. The winding supports are wound in succession, with the robot arm continuing to rotate from one winding support to the next after each support has been wound.

The European patent application EP 0 491 354 A1 shows a winding system for the production of fiber-reinforced components with a tape-laying head, in which a tape is pressed onto a core with a roller and then cured and hardened directly on the spot to fix the textile so that it cannot slip and remains in place.

The US patent application US 2003/0186038 A1 discloses a composite material made of multiple filament bands. The filament bands are wound to create a composite material. The filament bands may be impregnated with a solid or semi-solid resin. The filament bands are wound in multiple orientations to form a sheet of composite material. Additionally, the composite material may be made to have a varying number of layer and fiber orientations throughout the sheet of composite material. In another embodiment, a composite component requiring multiple layers and fiber orientations may be substantially manufactured during a filament winding process.

It is customary to carry out the winding process with a fiber strand which preferably consists of a carbon fiber filament.

It is an object of the invention to provide a winding device or a winding head and a winding method by means of which it is possible to produce fiber-reinforced components in a more versatile manner.

The object is solved in that the winding head comprises at least two supply spools for holding two fiber strands, and a first deflection roller is assigned to each supply spool, and a bundling roller, at which the at least two fiber strands can be combined to form a complete fiber strand upstream of the impregnation unit, is arranged downstream of and spaced apart from the first deflection rollers and in that a spreading roller is arranged downstream of and spaced apart from the bundling roller to form two fiber spreading sections.

This makes it possible to produce components that are designed to have more varied properties compared to conventional winding methods. It is thus possible to combine fiber strands having different properties, in particular carbon fiber and aramid fiber strands. The latter have improved impact strength compared to carbon fibers, so that components produced in this way are more resistant in this respect. Or carbon or aramid fibers can be combined with actuator yarns and/or sensor yarns. Actuators could be piezo elements or shape memory alloys. Electrical conductors or semiconductors with an outer insulating layer and the ends of which are connected to a measuring device can be used as sensor fibers. The arrangement of a spreading roller that is arranged downstream of and spaced apart from the bundling roller is made to form two fiber spreading sections. This provides a longer spreading line and distance for the fiber strands, in which the width and broadness of the fiber strand can be approximately doubled. This compensates the iridescent movements of the fiber strands on the respective supply coils.

It is also possible to combine two or more fiber strands of the same material in order to use a fiber strand with a larger cross section and thus shorten the winding process.

According to one advantageous refinement, a spreading roller has a deflection of more than 150. This provides a longer spreading section for the fiber strands, in which the width of the fiber strand can be approximately doubled. This compensates for the oscillating movements of the fiber strands on the respective supply spools.

According to one advantageous refinement, cleaning brushes for removing fiber strand residues are located on each of the bundling roller and/or spreading roller. The fiber strands, which consist of thousands of fiber filaments, regularly have torn filaments (fiber splice) which can be scraped off by the brushes.

According to one advantageous refinement, the impregnation unit comprises a mixing chamber in which at least one, preferably two or three deflection rollers are arranged for deflecting the complete fiber strand. These deflection rollers subject the fiber strand to lateral forces such that the filaments move towards each other and the fiber strand is better penetrated with the surrounding resin.

These deflection points are preferably configured as deflection sleeves slidingly mounted on pins. This allows them to be removed after opening the mixing chamber to improve the cleaning process at the deflection points.

According to one advantageous refinement, the winding head comprises three supply spools for three fiber strands and three first deflection spools which are preferably arranged next to or above each other with their axes of rotation parallel to each other.

According to one advantageous embodiment, the winding head is arranged fixed in position and the winding support to be wound around is attached to an articulated arm robot.

The object on which the invention is based is also achieved by a method for producing fiber-reinforced components by winding a resin-impregnated fiber strand around a winding support, the fiber strand having been applied by a winding device, which method is characterized in that at least two fiber strands are combined by means of a winding head to form a complete fiber strand and this is passed through an impregnation unit for admixture with resin, and from there to the winding support to be wound around the latter.

According to one advantageous embodiment, at least one supply spool is equipped with a carbon fiber. This type of fiber is characterized by a high tensile strength.

According to one advantageous embodiment, at least one supply spool is equipped with an actuator yarn. In this way, shape-changing structures such as geometrically-adjustable wing profiles which can advantageously change their shape depending on air flow conditions can be implemented by winding technology. The actuator yarns can be activated by applying a voltage for example.

According to one advantageous embodiment, at least one supply spool is equipped with a sensor yarn. Thus, what are known as system health monitoring (SHM) systems can be integrated into structures which enable monitoring of the load status of the component during operation.

According to one advantageous embodiment, at least one supply spool is equipped with an aramid fiber. This type of fiber is characterized by a high impact resistance.

Further advantages, features and details result from the following description in which an exemplary embodiment has been described in detail with reference to the drawings. Identical, similar and/or functionally identical parts have been provided with the same reference signs.

DETAILED DESCRIPTION OF THE DRAWINGS

Figure 1:
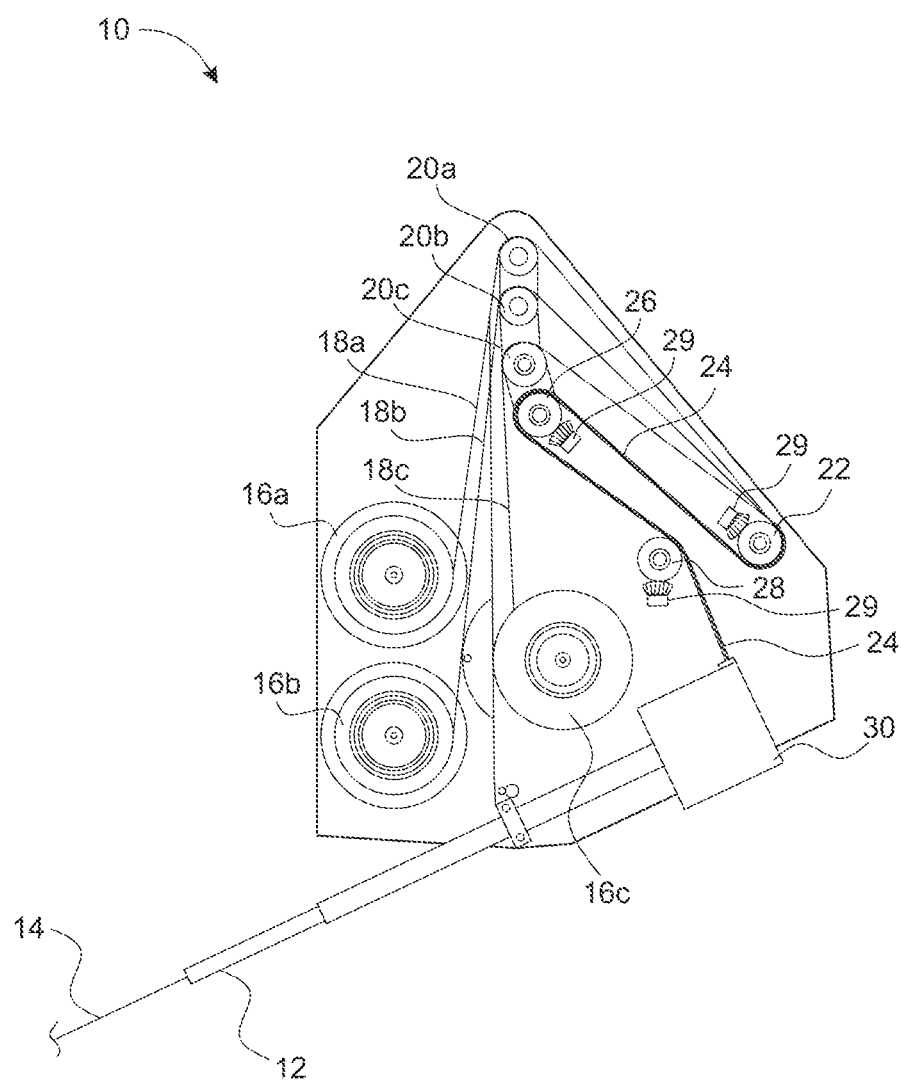
FIG. 1 shows a schematic side view of a winding device according to the invention.

FIG. 1 shows a winding head 10 which is preferably attached to an articulated arm robot (not shown) to perform three-dimensional movements by means of which a wound fiber strand 14 mixed with resin exiting from a fiber deposition tube 12 winds around a winding support (not illustrated) to produce a fiber-reinforced component. The overall system is preferably built as disclosed in DE 10 2017 005 754 A1. It is alternatively also possible to leave the winding head 10 fixed and to move the winding support by means of an articulated arm robot, as only the relative movements between the winding head 10 and the winding support are important. According to another alternative, it is possible to design both the winding head 10 and the winding support so that they can move relative to each other by means of suitable devices having a plurality of translational and rotational degrees of freedom.

The winding head 10 illustrated comprises three fiber supply spools 16a, 16b, 16c onto each of which are wound fiber strands 18a, 18b, 18c that can consist of several thousands of filaments made of identical or different materials. Preferably, but not necessarily, one fiber strand consists of carbon, another can consist of an aramid fiber or likewise of carbon or of an actuator yarn or a sensor yarn. In other embodiments not shown, instead of three fiber supply spools 16a, 16b, 16c, only two or four or more such supply spools can be provided.

The winding head 10 also comprises three deflection rollers 20a, 20b, 20c which are acted upon by the three fiber strands 18a, 18b, 18c. The three fiber strands 18a, 18b, 18c then act on a bundling roller 22 where they are combined and bundled to form a complete fiber strand 24. The complete fiber strand 24 then travels to a spreading roller 26 spaced apart from the bundling roller 22, and from there to an optional insertion roller 28 and from there into an impregnation unit 30 where it is mixed or impregnated with a curable resin. The wound fiber strand 14 mixed with resin exits from the impregnation unit 30 at the end of the fiber deposition tube 12.

Two spreading regions are defined for the complete fiber strand 24 between the bundling roller 22 and the spreading roller 26 on one side and the spreading roller 26 and the insertion roller 28, in which spreading regions the total fiber strand 24 is spread out to achieve better penetration with the resin in the impregnation unit 30.

Cleaning brushes 29 are arranged on each of the bundling roller 22, the spreading roller 26 and the insertion roller 28, the brushes cleaning these rollers during operation by scraping off torn filaments.

Figure 2:
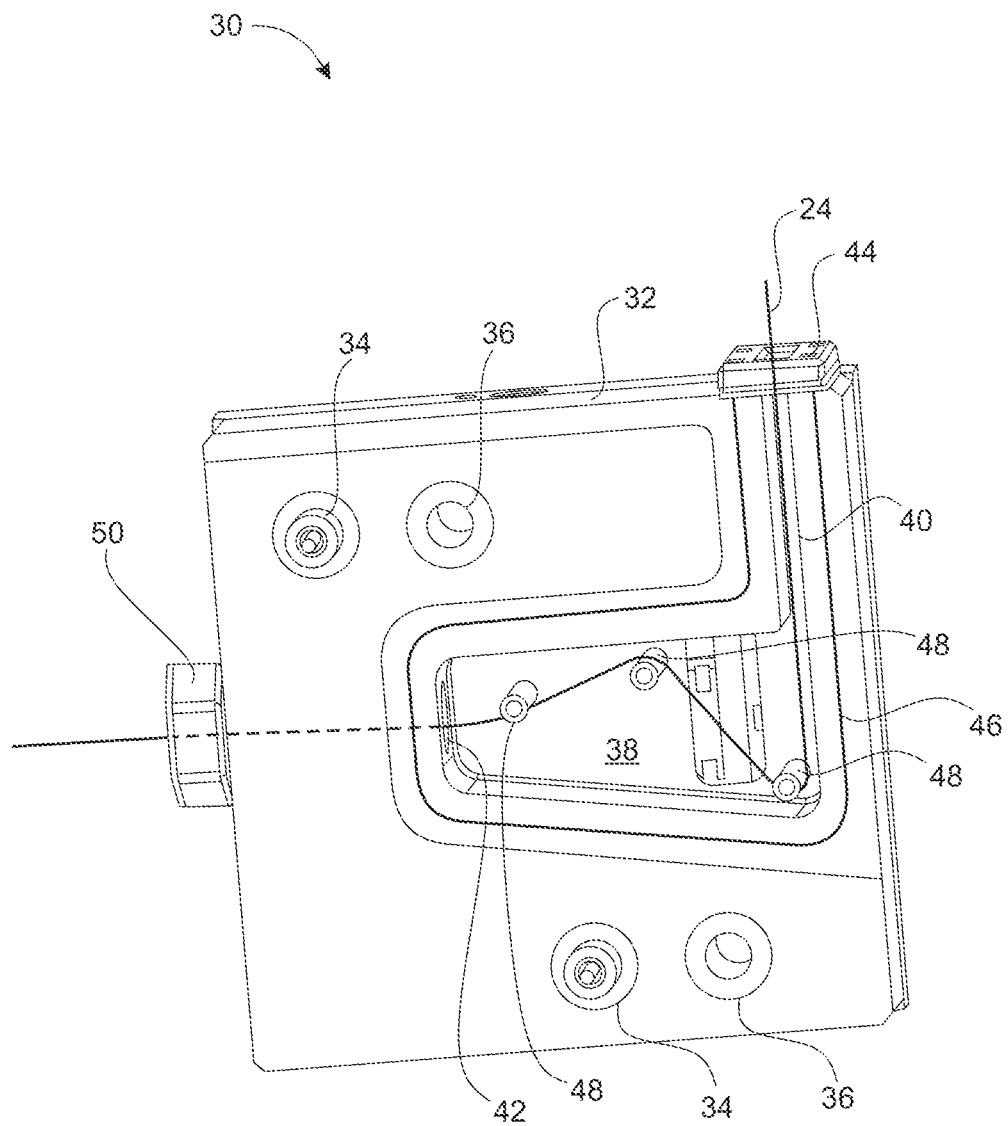
FIG. 2 shows a perspective view of an impregnation unit in the opened state.

FIG. 2 illustrates the impregnation unit 30 in the open state, consisting of two half shells, of which only the lower shell 32 fastened to the winding head 10 is shown. The two half shells have centering elements 34 and fixing holes 36 for fixing screws (not illustrated). The impregnation unit 30 has a mixing chamber 38 which has an inlet duct 40 and an outlet duct 42. Curable resin is forced into the impregnation chamber 30 by devices (not illustrated). The end of the inlet duct 40 is provided with a seal 44 which can be passed by the complete fiber strand 24 but prevents the resin from exiting. The mixing chamber 38 is enclosed by a sealing band 46 which prevents resin from exiting between the two half shells. In the mixing chamber 38, three deflection rollers 48 are arranged offset from one another in such a way that the complete fiber strand 24 is guided in zig-zag fashion through the mixing chamber 38 to achieve the most comprehensive penetration with resin possible. The deflection rollers 48 are preferably constructed as sleeves which are held and guided on pins. Thus, the deflection rollers 48 can be cleaned by removing the sleeves when the impregnation device 30 is dismantled. An impregnating nozzle (not shown in more detail), of which only the screw attachment 50 can be seen, is screwed into the outlet duct 42.

Although the invention has been illustrated and explained in detail by a preferred exemplary embodiment, the invention is not restricted by the examples disclosed and other variations may be derived therefrom by a person skilled in the art without departing from the scope of protection of the invention. It is therefore clear that a plurality of possible variations exist. It is also clear that embodiments mentioned by way of example are really only examples which are not to be understood in any way as limiting, for example, the scope of protection, the possible applications or the configuration of the invention. Rather, the preceding description and the description of the figures enable a person skilled in the art to implement the exemplary embodiments in concrete terms, whereby a person skilled in the art, being aware of the disclosed inventive concept, can make a variety of changes, for example with regard to the function or the arrangement of individual elements mentioned in an exemplary embodiment, without departing from the scope of protection defined by the claims and their legal equivalents, such as further explanations in the description.

LIST OF REFERENCE CHARACTERS 10 winding head
16 supply spools
18 fiber strands
20 deflection roller
22 bundling roller
24 complete fiber strand
26 spreading roller
29 cleaning brushes
30 impregnation unit
38 mixing chamber
48 deflection rollers

The invention claimed is:
1. A winding head (10), comprising:
a first supply spool (16a) for receiving a first fiber strand (18a) and a second supply spool (16b) for receiving a second fiber strand (18b);
an impregnation unit (30) through which the first fiber strand (18a) and the second fiber strand (18b) can be guided for impregnation with liquid resin;

a first deflection roller (20a) assigned to the first supply spool (16a) and a second deflection roller (20b) assigned to the second supply spool (16b);

a bundling roller (22), at which the first fiber strand (18a) and the second fiber strand (18b) can be combined to form a complete fiber strand (24) upstream of the impregnation unit (30), is arranged downstream of and spaced apart from the first deflection roller (20a) and the second deflection roller (20b); and a spreading roller (26) arranged downstream of and spaced apart from the bundling roller (22) to form a first spreading section for the complete fiber strand (24) between the bundling roller (22) and the spreading roller (26) and a second spreading section for the complete fiber strand (24) between the spreading roller 26 and the insertion roller 28 such that a spreading line and distance is achieved for the complete fiber strand (24) which approximately doubles a width of the complete fiber strand (24) to compensate for respective oscillating movements of the first fiber strand (18a) on the first supply spool (16a) and the second fiber strand (18b) on the second supply spool (16b) when the winding head (10) is in use.

2. The winding head (10) according to claim 1, wherein the impregnation unit (30) has a mixing chamber (38) in which a deflection roller (48) is arranged for deflecting the complete fiber strand (24).

3. The winding head (10) according to claim 2, wherein the deflection roller (48) is configured as a deflection sleeve slidingly mounted on a pin.

4. The winding head (10) according to claim 1, further comprising a third supply spool (16c) for receiving a third fiber strand (18c) and a third deflection roller (20c) assigned to the third supply spool (16c).

5. The winding head (10) according to claim 1, wherein the winding head (10) is fixed in position.

6. A method for producing a fiber-reinforced component by the winding head (10) according to claim 1, comprising the steps of:

combining a first fiber strand (18a) and a second fiber strand (18b) by the winding head (10) to form a complete fiber strand (24);

passing the complete fiber strand (24) through the bundling roller (22), the spreading roller (26), and the impregnation unit (30) for admixture with resin; and winding the resin-impregnated complete fiber strand (24) around a winding support.

7. The method according to claim 6, wherein at least one of the first supply spool (16a) and the second supply spool (16b) is equipped with a carbon fiber and/or an aramid fiber.

8. The method according to claim 6, wherein at least one of the first supply spool (16a) and the second supply spool (16b) is equipped with an actuator yarn or a sensor yarn.

9. A winding head (10), comprising:

a first supply spool (16a) for receiving a first fiber strand (18a) and a second supply spool (16b) for receiving a second fiber strand (18b);

an impregnation unit (30) through which the first fiber strand (18a) and the second fiber strand (18b) can be guided for impregnation with liquid resin;

a first deflection roller (20a) assigned to the first supply spool (16a) and a second deflection roller (20b) assigned to the second supply spool (16b);

a bundling roller (22), at which the first fiber strand (18a) and the second fiber strand (18b) can be combined to form a complete fiber strand (24) upstream of the impregnation unit (30), is arranged downstream of and spaced apart from the first deflection roller (20a) and the second deflection roller (20b);

a spreading roller (26) arranged downstream of and spaced apart from the bundling roller (22) to form two fiber spreading sections; and cleaning brushes (29) arranged on each of the bundling roller (22) and/or the spreading roller (26).

* * * * *